Aug. 17, 1965
A. R. CRIPE
3,200,549
CARGO SUPPORTING STRUCTURES FOR BULK
CONTAINERS, TRAILERS AND THE LIKE
Filed May 22, 1962
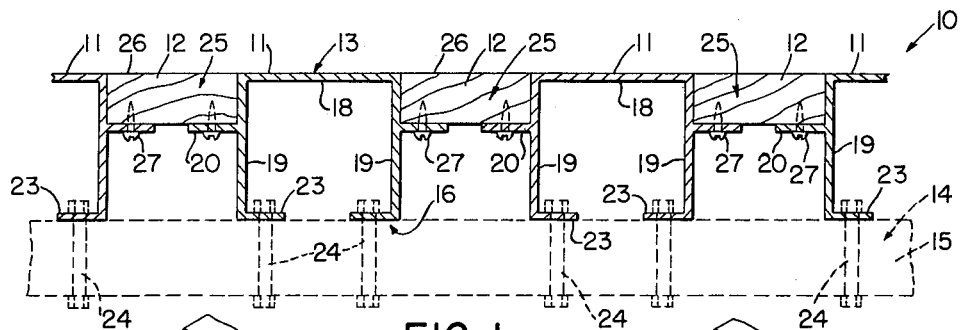
FIG-1
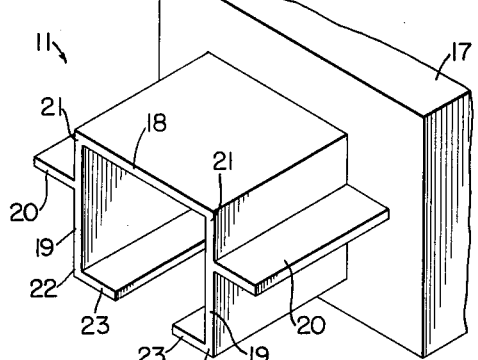
FIG-2
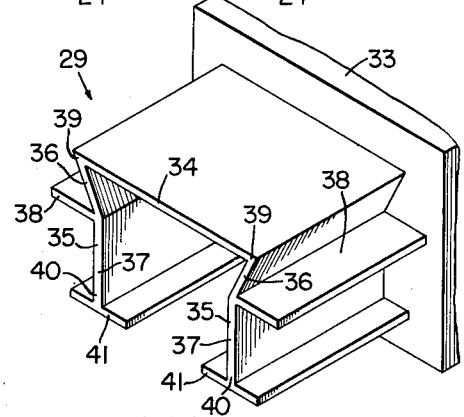
FIG-4
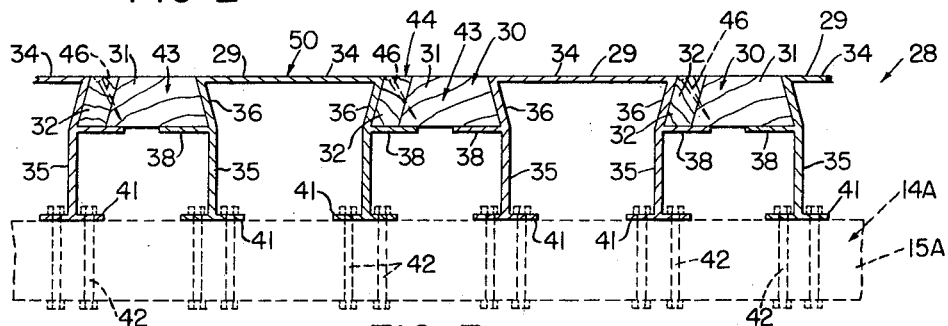
FIG-3
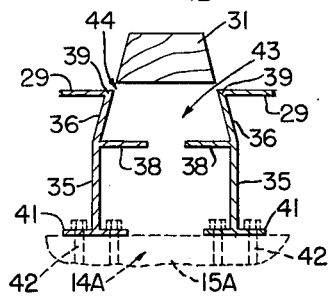
FIG-5
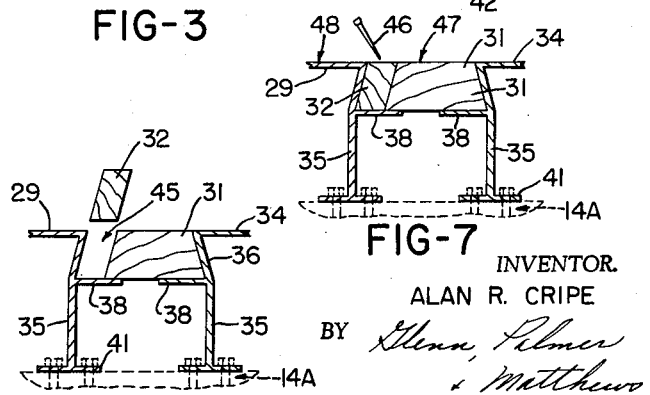
FIG-6
FIG-7
INVENTOR.
ALAN R. CRIPE
BY *Glenn, Palmer*
*& Matthews*
HIS ATTORNEYS United States Patent Office 3,200,549
Patented Aug. 17, 1965

3,200,549
CARGO SUPPORTING STRUCTURES FOR BULK
CONTAINERS, TRAILERS AND THE LIKE
Alan R. Cripe, Chesterfield County, Va., assignor to Reynolds Metals Company, Richmond, Va., a corporation of Delaware
Filed May 22, 1962, Ser. No. 196,757
1 Claim. (Cl. 52—376)

This invention relates to an improved supporting structure and to improved parts for such a structure or the like.

The supporting structure of this invention is readily adaptable to be utilized as a cargo supporting floor construction for relatively large bulk containers, truck or car trailers, freight railroad cars, and the like.

The supporting construction of this invention comprises a plurality of metallic members, such as aluminum-containing metallic members or the like, and a plurality of wooden members so constructed and arranged that the wooden members separate the metallic members to provide a floor construction and the like in a relatively simple and effective manner.

The composite floor construction of this invention is less expensive than in all metallic floor construction and the use of the wooden members between the metallic members provides greater insulation than in an all metallic floor.

Further, the use of the wooden members in the floor construction makes it easier to drive nails through cargo arresting blocks or the like into the floor construction to secure cargo in place thereon and to lessen the dunnage problem.

The metallic members of this invention can be simply formed by well-known extrusion operations and can be secured to the wooden members in a non-time consuming manner whereby the overall cost of the supporting construction of this invention is relatively low.

Accordingly, it is an object of this invention to provide an improved supporting structure having one or more of the novel features set forth above and hereinafter shown or described.

Another object of this invention is to provide an improved part for such a supporting construction or the like.

Other objects, uses and advantages of this invention are apparent from a reading of this description which proceeds with reference to the accompanying drawings forming a part thereof and wherein:

FIGURE 1 is a fragmentary, cross-sectional view of one embodiment of the floor construction of this invention.

FIGURE 2 is a schematic, perspective view illustrating the method of forming the metallic members of the supporting construction of FIGURE 1.

FIGURE 3 is a view similar to FIGURE 1 illustrating another supporting structure of this invention.

FIGURE 4 is a view similar to FIGURE 2 illustrating the method of making the metallic members of the supporting structure of FIGURE 3.

FIGURES 5–7 are respectively, fragmentary, cross-sectional views illustrating the method of assembling the wooden members to the metallic members of the supporting structure of FIGURE 3.

While the various features of this invention are hereinafter described as being particularly adaptable for providing a cargo supporting, floor construction for bulk containers, trailers and the like, it is to be understood that the various features of this invention can be utilized singly or in any combination thereof to provide other constructions as desired.

Therefore, this invention is not to be limited to only the embodiments illustrated in the drawings, because the drawings are merely utilized to illustrate one of the wide variety of uses of this invention.

Referring now to FIGURE 1, one embodiment of the supporting structure of this invention is generally indicated by the reference numeral 10 and comprises a plurality of spaced metallic members 11 interconnected to a plurality of wooden members 12 in a manner hereinafter described to define a cargo supporting surface 13, the supporting structure or floor construction 10 being secured to a sub-floor or frame means 14 of a trailer or the like.

For example, the sub-floor or frame means 14 of the trailer or the like can comprise a plurality of longitudinally disposed and spaced framing members 15 adapted to receive the lower surface 16 of the supporting structure 10 and provide access to the spacing between adjacent metallic members 11 by the spacing between adjacent frame members 15.

While the members 11 of this invention can be formed of any suitable material and in any suitable manner, the embodiment of the members 11 illustrated in the drawings are formed by extruding metallic material, such as aluminum-containing metallic material or the like by conventional extruding apparatus 17 as illustrated in FIGURE 2.

Each metallic member 11 has an inverted, substantially U-shaped cross-sectional configuration as illustrated in FIGURE 2 and defined by an upper flat cross member 18 having a pair of legs 19 depending from the opposed ends thereof.

Each leg 19 of each metallic member 11 has a flat shelf portion 20 extending outwardly therefrom and disposed intermediate the ends 21 and 22 thereof.

A supporting flange 23 is integrally interconnected to the free end 22 of each leg 19 and is preferably extending toward the flange 23 of the other leg 19 of the respective metallic member 11.

However, it is to be understood that the supporting flanges 23 could extend outwardly from the legs 19 in the same manner as the shelf portions 20 thereof, if desired.

The metallic members 11 are adapted to be cut to the desired lengths from the stock extruded by the apparatus 17 and are adapted to be placed on the sub-floor 14 in the spaced relation illustrated in FIGURE 1, the metallic members 11 being adapted to be secured to the supporting structure 14 in any suitable manner.

For example, the metallic members 11 can be secured to the frame members 15 by a plurality of bolt means 24 passing respectively through the framing members 15 and the mounting flanges 23 of the metallic members 11.

The assembled metallic members 11 are so spaced relative to each other that the same define outwardly upwardly facing channels 25 therebetween and defined in part by adjacent shelf portions 20 of adjacent metallic members 11.

The size of the channels 25 are so controlled that the same are adapted to fully receive the wooden members 12 in the manner illustrated in FIGURE 1. For example, the wooden members 12 can comprise conventional 2 inch by 4 inch boards or the like.

The shelf portions 20 of each metallic member 11 are so arranged relative to the top surface of the cross members 18 thereof that the upper surfaces 26 of the wooden members 12 are flush with the top surfaces of the cross members 18 when the wooden members 12 rest on the shelf portion 20 in the manner illustrated in FIGURE 1, whereby the cargo supporting surface 13 of the supporting structure 10 is substantially flat.

The wooden members 12 are adapted to be secured to the metallic members 11 by threaded fastening members 27 passing through the shelf portions 20 and into the undersurfaces of the wooden members 12, the wooden members 12 being secured to the shelf portions 20 by reaching between the adjacent frame members 15.

Therefore, it can be seen that the floor construction 10 can be assembled together in a relatively simple and non-time-consuming manner to provide a cargo supporting surface 13 which is readily adaptable to have cargo arresting blocks secured thereto, such as by having the cargo arresting blocks nailed directly to the wooden members 12 of the floor structure 10.

Further, because the floor construction 10 is formed of both metallic and wooden members, the overall cost of the floor construction 10 is relatively less and the insulation characteristics thereof are greater than if the same had been formed entirely of metallic material.

Another supporting structure of this invention is generally indicated by the reference numeral 28 in FIGURE 3 and comprises a plurality of metallic members 29 and wooden members 30, the wooden members 30 each being formed from a pair of wooden elements 31 and 32 in the manner hereinafter described.

The supporting structure 28 of this invention is adapted to be secured to a sub-floor 14A of a trailer or the like in the manner previously described, the sub-floor 14A comprising a plurality of longitudinally disposed and spaced frame members 15A.

While the members 29 of this invention can be formed in any suitable manner and of any suitable material, the embodiment thereof illustrated in the drawings is formed by extruding metallic material, such as aluminum-containing metallic material or the like, by a conventional extruding apparatus 33 as illustrated in FIGURE 4.

As illustrated in FIGURE 4, each metallic member 29 has an inverted, substantially U-shaped cross-sectional configuration defined by a flat cross member 34 having a pair of legs 35 depending from the opposed ends of the cross member 34.

Each leg 35 of each metallic member 29 has an upper portion 36 that is angularly disposed relative to the cross member 34 and extends inwardly from the adjacent end of the cross member 34, each portion 36 being interconnected to a lower portion 37 which is substantially perpendicularly disposed relative to the cross member 34.

An outwardly extending shelf portion 38 is integrally formed on each leg 35 of each metallic member 29, the shelf portion 38 joining the leg 35 at the juncture between the portions 36 and 37 thereof and being disposed intermediate the opposed top and bottom 39 and 40 of its respective leg 35 for a purpose hereinafter described.

A mounting or supporting flange 41 is medially joined to the free edge 40 of each leg 35 of each metallic member 39.

Therefore, it can be seen that the metallic members 29 can be formed in a relatively simple manner by merely extruding stock from the apparatus 33 and cutting the stock into the desired lengths.

When it is desired to form the supporting structure or floor construction 28 illustrated in FIGURE 3, a plurality of metallic members 29 are arranged in spaced relation on the sub-floor 14A and are secured thereto by a plurality of bolt means 42 passing respectively through the framing members 15A and the mounting flanges 41 of the metallic members 29.

The metallic members 29 are so constructed and arranged that the adjacent shelf portions 38 thereof cooperate together to define an outwardly facing channel 43 between adjacent metallic members 29, the channels 43 each having a substantially trapezoidal cross-sectional configuration for a purpose hereinafter described.

The adjacent ends 39 of the adjacent legs 35 of adjacent metallic members 29 define an opening 44 to the respective channel 43, the opening 44 having a width substantially smaller than the width of the channel 43 at the shelf portions 38 thereof.

The wooden members 30 are subsequently disposed in the channels 43 of the adjacent metallic members 29 to complete the supporting structure 28 in the manner illustrated in FIGURE 3.

In particular, the wooden element 31 of each wooden member 30 has a substantially trapezoidal cross-sectional configuration as illustrated in FIGURE 5 and is substantially smaller than the trapezoidal channel 43 whereby the wooden element 31 is adapted to be readily inserted in the opening 44 of a particular channel 43 in the manner illustrated in FIGURE 5 and be subsequently pushed against one of the legs 35 in the manner illustrated in FIGURE 6 to define a part channel 45 having parallel sides.

The wooden element 32 of each wooden member 30 has a cross-sectional configuration similar to a parallelogram and is adapted to be inserted substantially vertically downwardly into the remaining channel 45 in the manner illustrated in FIGURES 6 and 7 to completely fill the channel 43.

Subsequently, fastening members 46, such as nails or the like, are utilized to fasten together the wooden elements 31 and 32 when the same are fully disposed in a particular channel 43 to form the wooden member 30 having a trapezoidal cross-sectional configuration that completely fills the channels 43 whereby the wooden members 30 are completely interlocked in the channels 43 and cannot be removed without separating the wooden elements 31 and 32 thereof.

In this manner, the upper surfaces 47 of the wooden members 30 are disposed flush with the upper surfaces 48 of the metallic members 29 to define a flat cargo supporting surface 50 of the floor construction 28.

Accordingly, cargo and the like can be readily disposed on the upper surface 50 of the supporting structure 28 and can be arrested by arresting blocks or the like placed on the supporting surface 50 and nailed to the wooden members 30 in the manner previously described.

Therefore, it can be seen that the supporting structures of this invention are readily adaptable for forming the floor constructions for bulk containers, trailers, railroad freight cars, and the like in a relatively simple manner whereby each floor construction comprises a combination of metallic and wooden members to readily permit arresting blocks to be secured thereto and to solve the dunnage problem.

Further, the composite supporting structures of this invention provide greater insulation than provided by all metallic supporting structures and are less expensive than all metallic supporting structures.

Accordingly, this invention provides improved supporting structures as well as improved parts for such supporting structures or the like.

While the form of the invention now preferred has been disclosed as required by the statutes, other forms may be used, all coming within the scope of the claim which follows.

What is claimed is:

A supporting structure having opposed surfaces and comprising a plurality of spaced metallic members respectively having opposed top and bottom edges respectively defining part of said opposed surfaces, each metallic member having a substantially U-shaped cross sectional configuration defined by a cross member forming part of one of said surfaces and defined by a pair of legs, each leg of each metallic member having an outwardly extending shelf portion extending toward a shelf portion of an adjacent metallic member and being disposed intermediate the top and bottom edges of the respective metallic member, each adjacent pair of shelf portions cooperating with their respective legs to define an interlocking channel between the respective metallic members, each interlocking channel having a trapezoidal cross-sectional configuration, a plurality of wooden members respectively disposed in said interlocking channels and resting on said shelf portions, each leg of each metallic member having a portion thereof disposed closed to a like portion of an adjacent metallic member at the cross member thereof than at the shelf portion thereof to define a reduced opening to its respective channel, each wooden member including a pair of wooden elements, one of said elements of each wooden member having a trapezoidal cross-sectional configuration and being receivable through said opening of one of said channels, the other of said elements being insertable in said opening after said one element to fill said channel, and means securing said elements together in said channel.

References Cited by the Examiner

UNITED STATES PATENTS

| | | |
|---|---|---|
| 2,214,547 | 9/40 | Bonsall. |
| 2,256,037 | 9/41 | Reid _____ 296—28 |
| 2,307,149 | 1/43 | Milz et al. |
| 3,080,021 | 3/63 | Muir. |

FOREIGN PATENTS

| | | |
|---|---|---|
| 771,298 | 3/57 | Great Britain. |
| 834,438 | 5/60 | Great Britain. |

A. HARRY LEVY, *Primary Examiner.*